US006024029A

United States Patent [19]
Clark

[11] Patent Number: 6,024,029
[45] Date of Patent: Feb. 15, 2000

[54] REDUCED EMISSION COMBUSTION SYSTEM

[76] Inventor: Steve L. Clark, 1730 Hillcrest, Baytown, Tex. 77520

[21] Appl. No.: 09/181,110

[22] Filed: Oct. 28, 1998

Related U.S. Application Data

[62] Division of application No. 08/730,974, Oct. 16, 1996.

[51] Int. Cl.[7] .................................................. F23J 3/00
[52] U.S. Cl. ........................ 110/216; 110/203; 110/204; 110/215; 110/210; 110/233; 431/2; 60/39.182; 423/210
[58] Field of Search .................................. 110/203, 204, 110/210, 215, 216, 217, 233, 234, 342, 344, 345; 60/648, 39.182; 423/210, 244; 431/2, 5

[56] References Cited

U.S. PATENT DOCUMENTS

| | | |
|---|---|---|
| 2,102,427 | 12/1937 | Lloyd et al. . |
| 2,143,283 | 1/1939 | Schmidt . |
| 3,001,373 | 9/1961 | Eastman et al. . |
| 3,403,643 | 10/1968 | Denig . |
| 3,628,332 | 12/1971 | Kelmar . |
| 3,661,719 | 5/1972 | Kelmar . |
| 3,779,212 | 12/1973 | Wagner . |
| 3,859,174 | 1/1975 | Taylor . |
| 3,861,330 | 1/1975 | Santoleri . |
| 3,861,332 | 1/1975 | Itasaka . |
| 3,861,334 | 1/1975 | Stockman . |
| 3,905,745 | 9/1975 | Konda ............................................ 431/2 |
| 4,143,515 | 3/1979 | Johnson ...................................... 60/648 |
| 4,344,486 | 8/1982 | Parrish ................................. 166/274 X |
| 4,358,344 | 11/1982 | Sass et al. . |
| 4,437,419 | 3/1984 | Hertel ......................................... 110/259 |
| 4,520,741 | 6/1985 | Carbeau et al. ........................... 110/344 |
| 4,542,114 | 9/1985 | Hegarty . |
| 4,620,492 | 11/1986 | Vogg et al. ................................ 110/345 |
| 4,656,972 | 4/1987 | Shimoda ...................................... 122/40 |
| 4,762,074 | 8/1988 | Sorensen .................................... 110/346 |
| 4,782,772 | 11/1988 | Chughtai et al. .......................... 110/345 |
| 4,827,854 | 5/1989 | Collette ..................................... 110/237 |
| 4,829,911 | 5/1989 | Nielson ..................................... 110/234 |
| 4,852,344 | 8/1989 | Warner .................................. 60/39.182 |
| 4,860,670 | 8/1989 | Jorgensen ................................. 110/215 |
| 4,922,841 | 5/1990 | Kent .......................................... 110/346 |
| 5,016,599 | 5/1991 | Jubb . |
| 5,035,188 | 7/1991 | Johnson et al. . |
| 5,041,144 | 8/1991 | Lath ......................................... 55/70 X |
| 5,050,508 | 9/1991 | Wilson ...................................... 110/235 |
| 5,120,517 | 6/1992 | Elshout ................................. 423/244 X |
| 5,129,331 | 7/1992 | Merritt et al. ............................ 110/203 |
| 5,179,903 | 1/1993 | Abboud et al. ........................... 110/345 |
| 5,188,041 | 2/1993 | Noland et al. ............................ 110/246 |
| 5,222,446 | 7/1993 | Edwards et al. .......................... 110/235 |
| 5,309,850 | 5/1994 | Downs et al. ............................ 110/235 |
| 5,339,755 | 8/1994 | Smith ....................................... 110/345 |
| 5,344,627 | 9/1994 | Fujii et al. ................................ 423/220 |
| 5,403,569 | 4/1995 | Abdelmalek ............................. 423/342 |
| 5,450,801 | 9/1995 | Abboud .................................... 110/203 |
| 5,452,763 | 9/1995 | Owen ........................................ 166/259 |
| 5,467,722 | 11/1995 | Meratla ..................................... 110/345 |
| 5,500,194 | 3/1996 | Bell ........................................ 423/239.1 |
| 5,518,621 | 5/1996 | Holocombe et al. ..................... 210/634 |
| 5,645,730 | 7/1997 | Malachosky et al. .................... 210/665 |
| 5,659,110 | 8/1997 | Herden et al. ........................ 423/210 X |
| 5,662,050 | 9/1997 | Angelo, II et al. ....................... 110/246 |
| 5,665,319 | 9/1997 | Hirama et al. ............................ 422/177 |
| 5,709,077 | 1/1998 | Beichel ................................... 60/39.55 |
| 5,711,770 | 1/1998 | Malina ..................................... 48/197 R |
| 5,724,805 | 3/1998 | Golomb et al. .......................... 60/39.02 |

Primary Examiner—Ira S. Lazarus
Assistant Examiner—Ljiljana V. Ciric
Attorney, Agent, or Firm—Akin, Gump, Strauss, Hauer & Feld, L.L.P.

[57] ABSTRACT

A system and a process for combusting hydrocarbons to recover energy and the carbon dioxide resulting from the combustion is provided. The process utilizes a two-stage combustion process, each stage utilizing water injection and a recirculation stream to increase the efficiency of combustion to generate larger proportions of carbon dioxide. An energy recovery boiler is used to recover heat energy from the combustion product. Combustion product is then cleaned and the carbon dioxide is separated and condensed into a useable liquid carbon dioxide product.

15 Claims, 7 Drawing Sheets

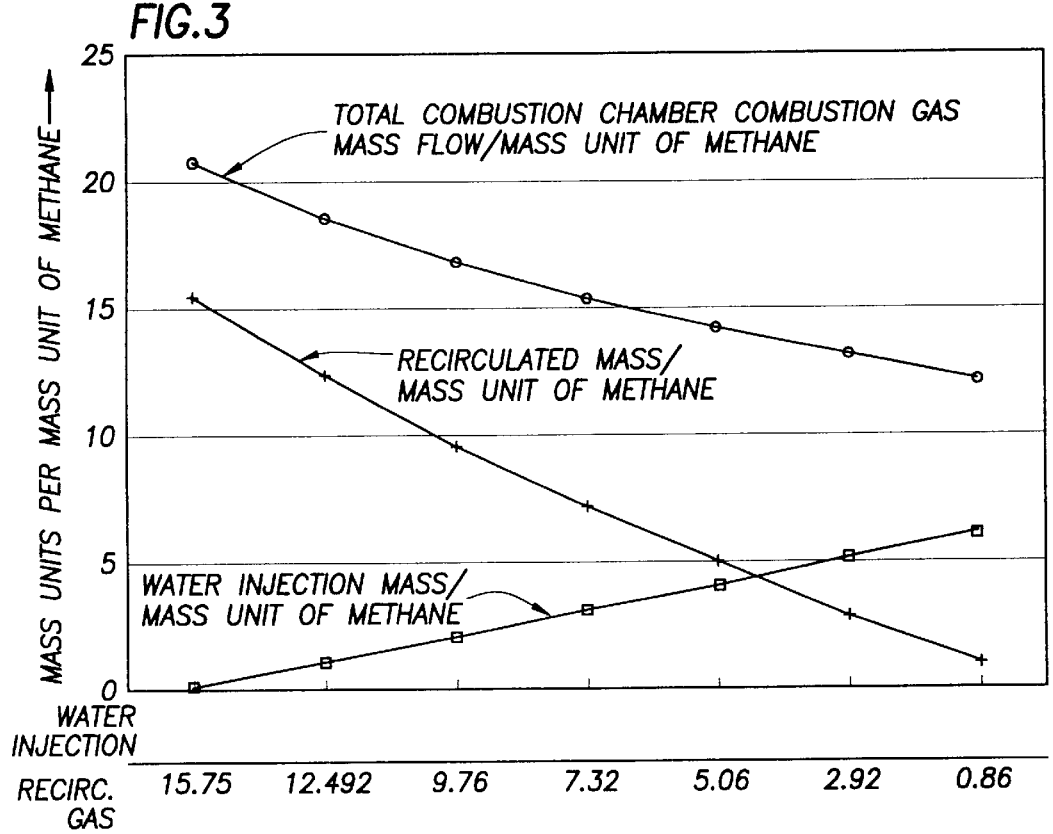
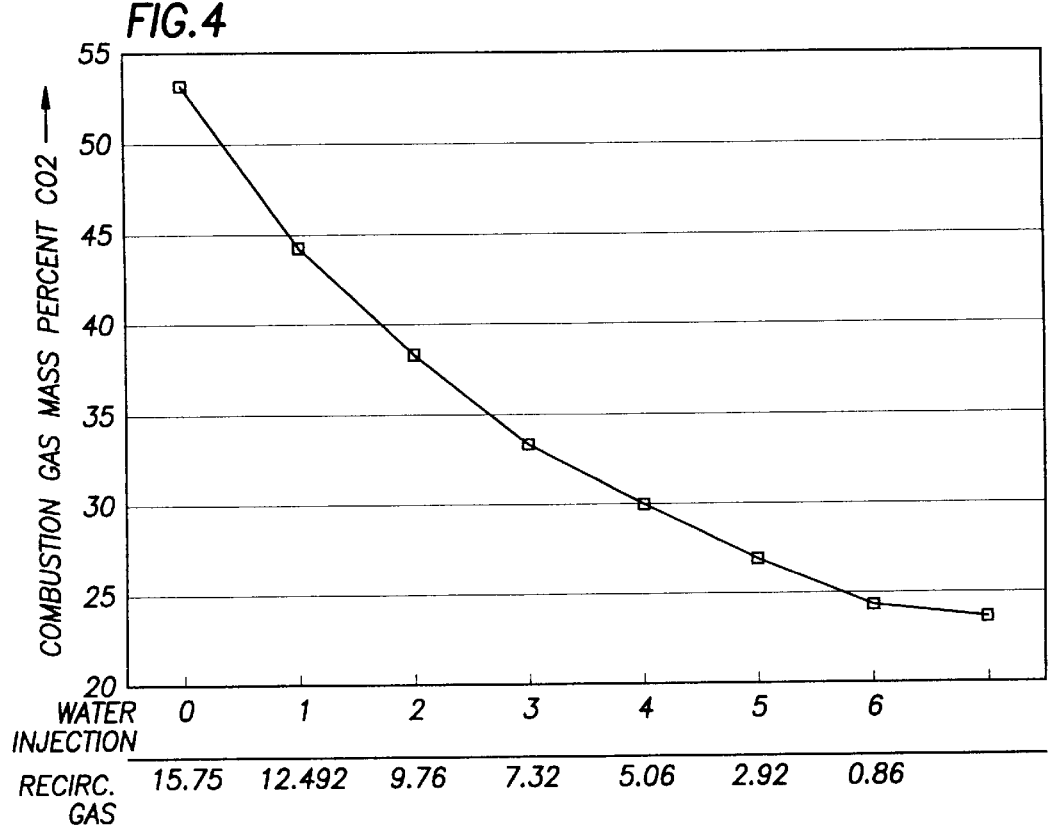

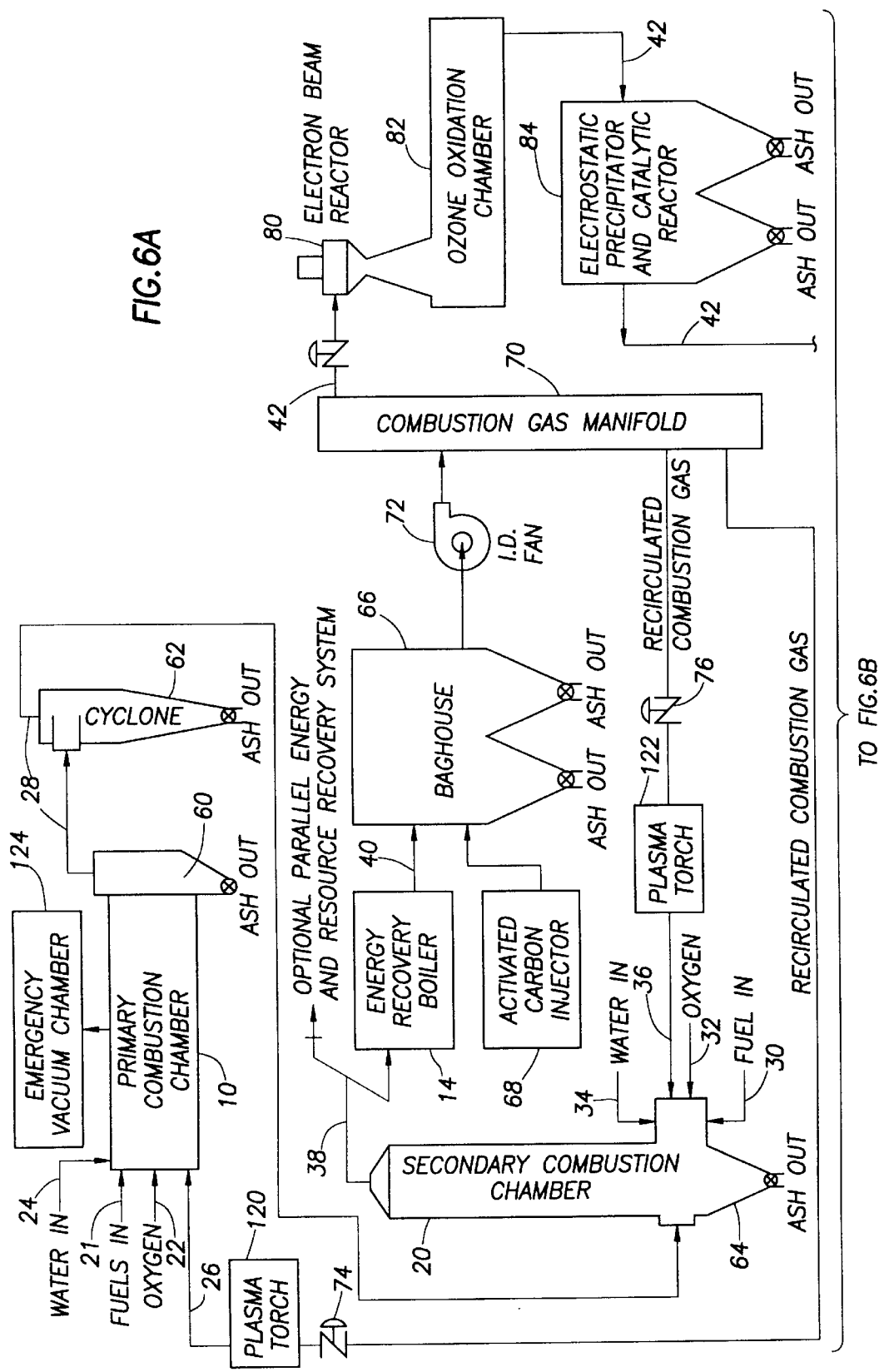

ન6,024,029

REDUCED EMISSION COMBUSTION SYSTEM

CROSS-REFERENCE TO RELATED APPLICATIONS

This is a divisional of prior co-pending application Ser. No. 08/730,974 filed Oct. 16, 1996.

BACKGROUND OF THE INVENTION

1. Field of the Invention

This invention relates to a system and a method for combusting hydrocarbon streams. More specifically, this invention relates to a system and a method of combusting hydrocarbon streams to recover energy that also maximizes the amount of carbon dioxide produced during combustion and provides for recovery of the carbon dioxide produced.

2. Description of the Prior Art

Combustion processes have for millions of years been mankind's most common and essential means of releasing energy for comfort and preparation of food. In recent times those same processes have additionally become essential for transportation, industrial commerce, and the disposal of organic refuse. With an increasing worldwide population and an increased per capita demand for energy, concern is now being raised over the environmental pollution resulting from the emission of gaseous byproducts from combustion processes. Even carbon dioxide, a gaseous compound produced during combustion by oxidation of carbon and essential to plant life, is being viewed as a pollutant today. Carbon dioxide has been identified as one of many "greenhouse" gases and an increased level in the earth's atmosphere is thought likely to contribute to an undesirable global warming effect. No more than twenty years ago the scientific community was concerned that the earth's atmosphere was cooling and progressing toward the next "ice age". Obviously some confusion continued to exist along with a lack of complete understanding of the many factors involved in the thermal energy balance of the earth's crust and the gases comprising the earth's atmosphere. We do understand enough to know that measurable changes in the composition of the earth's atmosphere will produce added risk of undesirable changes to the global climate. Until we do completely understand the effects of certain ongoing changes we should attempt to moderate or even stop those changes from occurring where we can exercise control.

Carbon dioxide production from combustion processes can only be reduced by reducing the level of combustion or converting from carbon containing fuels to fuel such as pure hydrogen. When electrical energy is abundantly available from controlled nuclear fusion or the like, hydrogen fuel can be produced for combustion by electrolysis of water. In the meantime it is essential that we learn to be more conservative with our use of energy from combustion, make good use of usable combustion byproducts and limit to the best of our ability the emission of undesirable and harmful byproducts from the combustion processes employed for our comfort and well being.

Carbon dioxide is a usable byproduct of the combustion of hydrocarbon fuels. Today most carbon dioxide from combustion processes is released into the atmosphere. The rate of production and release has surpassed the ability of existing plant life on earth to utilize and the level of carbon dioxide in the atmosphere is known to be increasing. Concerns over the effects of an increase "greenhouse" effect due to the increased carbon dioxide level in the atmosphere dictate that we do as many things as practical to slow or stop the increase in carbon dioxide level in the earth's atmosphere. One method of control is to capture, liquefy and beneficially utilize carbon dioxide from combustion processes. Among the many beneficial uses of carbon dioxide are enhanced yields from oil wells, detoxification of substances contaminated by hazardous hydrocarbons, fire suppression, food preservation and enhanced growth and production from plants in greenhouses.

SUMMARY OF THE INVENTION

Combustion processes can be configured and operated in a manner which optimizes the ability to recover carbon dioxide as a usable byproduct. The invention described here is a combustion process configured to optimize carbon dioxide recovery. The process additionally lends itself to extreme limitations on the production of undesirable and harmful combustion byproducts while providing the means to control the emission of those harmful byproducts. Under optimum conditions the process can be considered emission-free.

The invention is a combustion process which maximizes the ratio of carbon dioxide level to the level of all other combustion gas constituents in the post combustion chamber gas stream and facilitates the efficient capture and liquefication of the carbon dioxide produced by the hydrocarbon fuels combustion process for use as a commercial product. When optimally employed the process yields only carbon dioxide, water vapor and oxygen as constituents of the combustion gas stream. All of these constituents may be segregated, captured, contained and reused in the process, filtered and discharged as liquid or sold to other interests as a commercial product for beneficial use. In less than optimum applications the hydrocarbon fuels being combusted might contain chemical impurities such as sulphur, chlorine, nitrogen, and inorganic refractory constituents. To facilitate the employment of the process in these less than optimum circumstances various means of removal, neutralization and containment of the combustion byproducts from the fuel impurities are included in the invention. When practical these "undesirable" combustion byproducts may be converted into usable commercial products.

BRIEF DESCRIPTION OF THE DRAWINGS

A better understanding of the invention can be obtained when the detailed description set forth below is reviewed in conjunction with the accompanying drawings, in which:

FIG. 3 is a graphical representation depicting the impact of water injection and recirculation upon the combustion process of the present invention;

FIG. 4 is a graphical representation of the impact of water injection and recirculation gas on the percentage of carbon dioxide produced during combustion;

FIGS. 6A and 6B depict a process flow diagram of the embodiment shown in FIGS. 5A and 5B with additional optional features.

DETAILED DESCRIPTION OF THE PREFERRED EMBODIMENT

Figure 1:
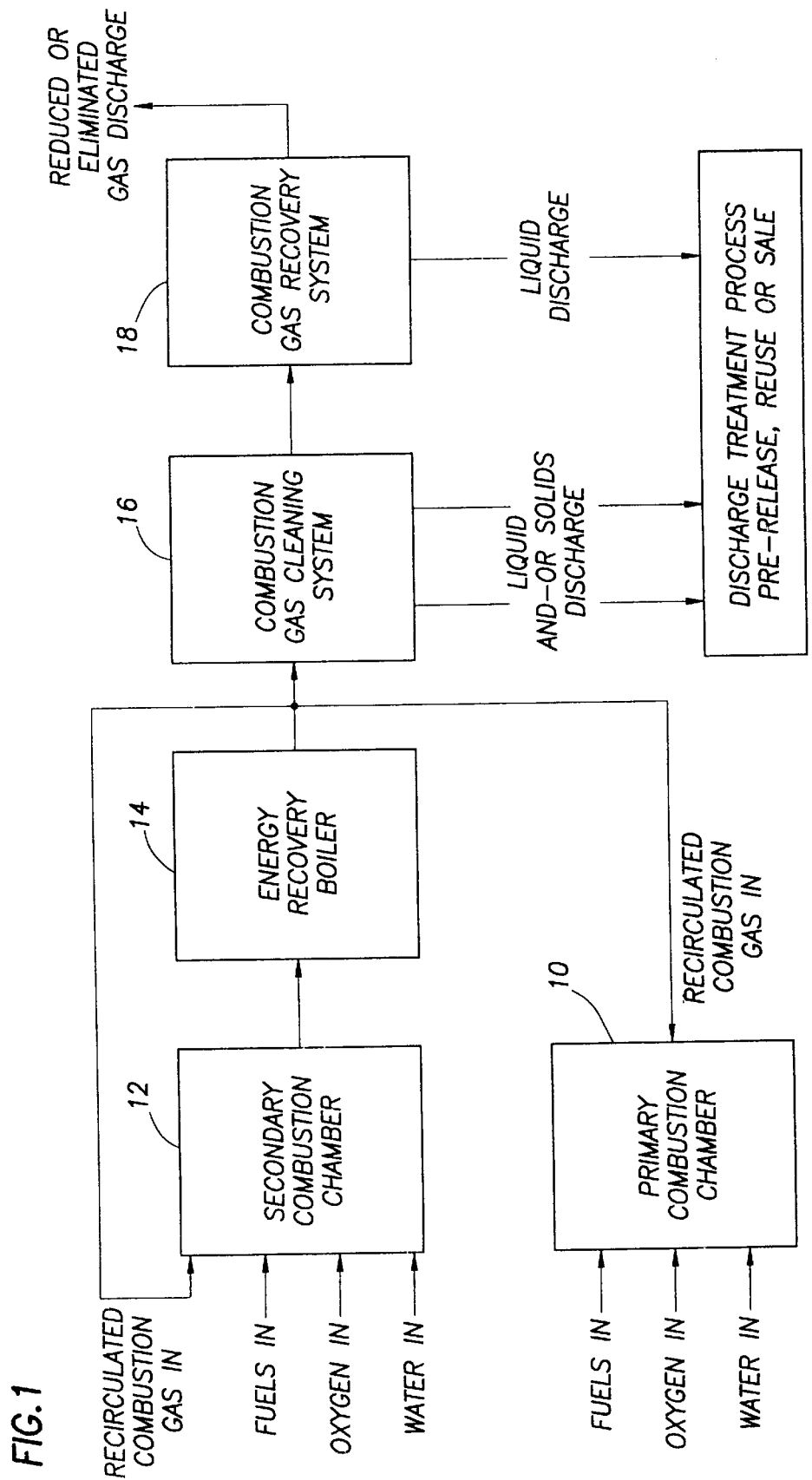
FIG. 1 is a block flow diagram of an embodiment of the present invention.

As shown in FIG. 1, the present invention is a process for combusting hydrocarbon fuels and recovering as much of the combustion product gases as possible, thereby reducing or eliminating atmospheric discharge. A fuel stream is injected into primary combustion chamber 10 along with a substantially pure oxygen stream and a water stream. The fuel, oxygen, and water streams are combusted in primary combustion chamber 10 and the combustion product is then transferred to secondary combustion chamber 12. In secondary combustion chamber 12, the combustion product is further combusted along with additional fuel, oxygen, and water streams to produce a final reaction product stream. The reaction product stream is then introduced to an energy recovery boiler 14 or other means of removing and recovering heat energy from the reaction product stream. The cooled reaction product stream is then split with a portion of the cooled reaction product stream being recirculated to primary combustion chamber 10, a portion being recirculated to secondary combustion chamber 12, and a portion proceeding forward to combustion gas cleaning system 16. In combustion gas cleaning system 16, the cooled reaction product stream is treated to remove acidic components, residual organic components, and finally to separate the water contained in the reaction product stream from the carbon dioxide. Carbon dioxide is then introduced into combustion gas recovery system 18 where it is purified and liquefied to produce a liquid carbon dioxide product. As will be recognized by those skilled in the art, implementation of these components of the present invention will reduce or eliminate the gas discharge to the atmosphere.

Ideal complete combustion of a pure hydrogen fuel with pure oxygen yields carbon dioxide and water as the products of combustion. To insure high combustion efficiency, an excess of oxygen is required along with high temperature, high combustion gas turbulence, and long combustion gas residence time in the chamber(s) supporting the combustion process. These factors all contribute to contact opportunity between oxygen molecules and molecules of hydrogen fuel(s) by producing robust mixing of the gases for long periods of time. The high temperature additionally provides the drive or ignition energy to produce the chemical reaction between the oxygen and fuel(s) when contact between molecules occurs.

Wagner teaches in U.S. Pat. No. 3,779,212 that a pure hydrogen fuel oxidized with pure oxygen produces carbon dioxide, water, and carbonic acid as products of combustion. Wagner further teaches that the carbonic acid rapidly disassociates into carbon dioxide and water resulting in only carbon dioxide and water as the ultimate products of the process. Wagner additionally teaches that the flame temperature associated with the combustion of pure methane with pure oxygen can reach 6,000 degrees Fahrenheit, (3,315.56 degrees Celsius). Wagner's invention is a specialized boiler designed to maximize thermal efficiency with very small size and low weight per unit of energy derived. For refractory lined combustion chambers and standard energy recovery boiler systems, lower combustion gas temperatures are required. Typical refractory limitations on continuous operating temperature are in the area of 2,500 degrees Fahrenheit (1371.1 degrees Celsius). The present invention utilizes pure oxygen for combustion, but additionally utilizes a combination of water injection and combustion gas recirculation to moderate and control the combustion gas temperature achieved in the combustion chambers.

The utilization of oxygen for combustion and water injection and recirculated combustion gas to moderate combustion gas temperature avoids the introduction of nitrogen into the combustion process. As taught by Wagner, nitrogen in a combustion process leads to the formation of pollution in the form of oxides of nitrogen (NOx). Since air is composed of roughly 80% nitrogen by volume, the present invention by design avoids the employment of air as the source of oxygen for combustion or as a means for moderating the combustion gas temperature in the combustion chambers. Other reasons for avoiding use of air in the present invention are the fact that a high volume of combustion gas would be produced per unit of fuel combusted and the resulting combustion gas would contain a lower percentage of carbon dioxide making carbon dioxide recovery less efficient.

The following formulation and calculations detail the relationship discussed above:

Combustion of methane with pure oxygen

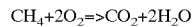

For each mole weight of methane two mole weights of oxygen are required for stoichiometric combustion. One mole weight of methane equals 16 atomic weight units while two mole weights of oxygen equals 64 atomic weight units. Each kilogram of pure methane then requires four kilograms of pure oxygen for stoichiometric combustion resulting in 5 kilograms of combustion gas consisting of one mole weight of carbon dioxide and two mole weights of water. Carbon dioxide has a mole weight of 44 atomic weight units while water has a mole weight of 18 atomic weight units. The stoichiometric combustion of one kilogram of pure methane with pure oxygen then product $(5 \times (44/80))=2.75$ kilograms of carbon dioxide and $(5 \times ((2 \times 18)/80)))=2.25$ kilograms of water.

Typically, an excess amount of oxygen is supplied to a combustion process to provide greater opportunity for complete combustion of fuels than is afforded by a one to one stoichiometric ratio of oxygen to fuel. Depending on the fuel being combusted and the combustion process efficiency the typical amount of excess oxygen supplied is in the range of 5% to 10%. For this discussion and for ease of calculation consider a 5% excess of oxygen for a practical combustion process. In such case each kilogram of pure methane would then require 4.2 kilograms of pure oxygen for combustion resulting in the production of 5.2 kilograms of combustion gas of which 0.2 kilograms is residual oxygen. By weight percentage the combustion gas composition from this process would then be as follows:

Carbon Dioxide: $(2.75/5.2) \times 100 = 52.88462\%$

Water: $(2.25/5.2) \times 100 = 43.26923\%$

Oxygen: $(0.2/5.2) \times 100 = 3.84615\%$

Using the known heating value of methane, calculated approximate specific heat capacities for the combustion gas constituents, an approximate ambient temperature and an approximate resultant combustion gas temperature can be calculated. The following relationship applies:

$$T_{GAS} = T_{AMB} + ((Q_{REL} - Q_{LOSS})/C_P)/M_{GAS})$$

Where $T_{GAS}$=Resultant Combustion Gas Temperature $T_{AMB}$=Ambient Temperature $Q_{REL}$=Thermal Energy Release Rate $Q_{LOSS}$=Thermal Energy Loss Rate $C_P$=Combustion Gas Specific Heat Capacity $M_{GAS}$=Combustion Gas Mass Flow Rate The published heat of combustion of methane is 21,520 BTU/LB (11,955.55 Kilo Cal/Kilogram). This value takes into account the latent heat of vaporization of the water produced in the combustion reaction and is applicable for the above equation.

The heat capacity of a given gas varies with temperature and pressure. Working with a constant pressure the specific heat capacity with variation due only to temperature can be derived, $C_P$. For this analysis a constant pressure of one atmosphere may be assumed. Data are available for the gases of interest here at one atmosphere of pressure over the range of temperature to be encountered in a combustion process. $C_p$ for these gases may be expressed as a polynomial function of the form, $C_P = a_0 + a_1 T^2 + a_3 T^3 = \ldots a_n T^n$ where T is the absolute temperature of the gas of interest. In the temperature range of 0 to 2,500° F. the following fourth order polynomials with 99.0% confidence level have been derived for the atmosphere constant pressure specific heat capacities of the noted gases:

Carbon Dioxide: $C_{P(CO2)} = 0.155989405 + 0.000194244567(T) - 5.69601423 \times 10^{-8}(T^2) = 2.64619520 \times 10^{-13}(T^3) + 4.73867961 \times 10^{-17}(T^4)$ KCal/KF-° K Oxygen: $C_{P(O2)} = 0.194741234 + 9.17986378 \times 10^{-5}(T) - 3.60408938 \times 10^{-8}(T^2) + 1.03017213 \times 10^{-11}(T^2) - 3.13211436 \times 10^{-15}(T^4)$ KCal/kg-° K Water Vapor: $C^{P(H2O)} = 0.378246954 + 0.0002190970339(T) - 7.65417026 \times 10^{-8}(T^2) + 4.54506122 \times 10^{-11}(T^3) - 1.22059215 \; 10^{31 \; 14}(T^4)$ KCal/Kg-° K Where T is temperature in degrees Kelvin.

Figure 2:
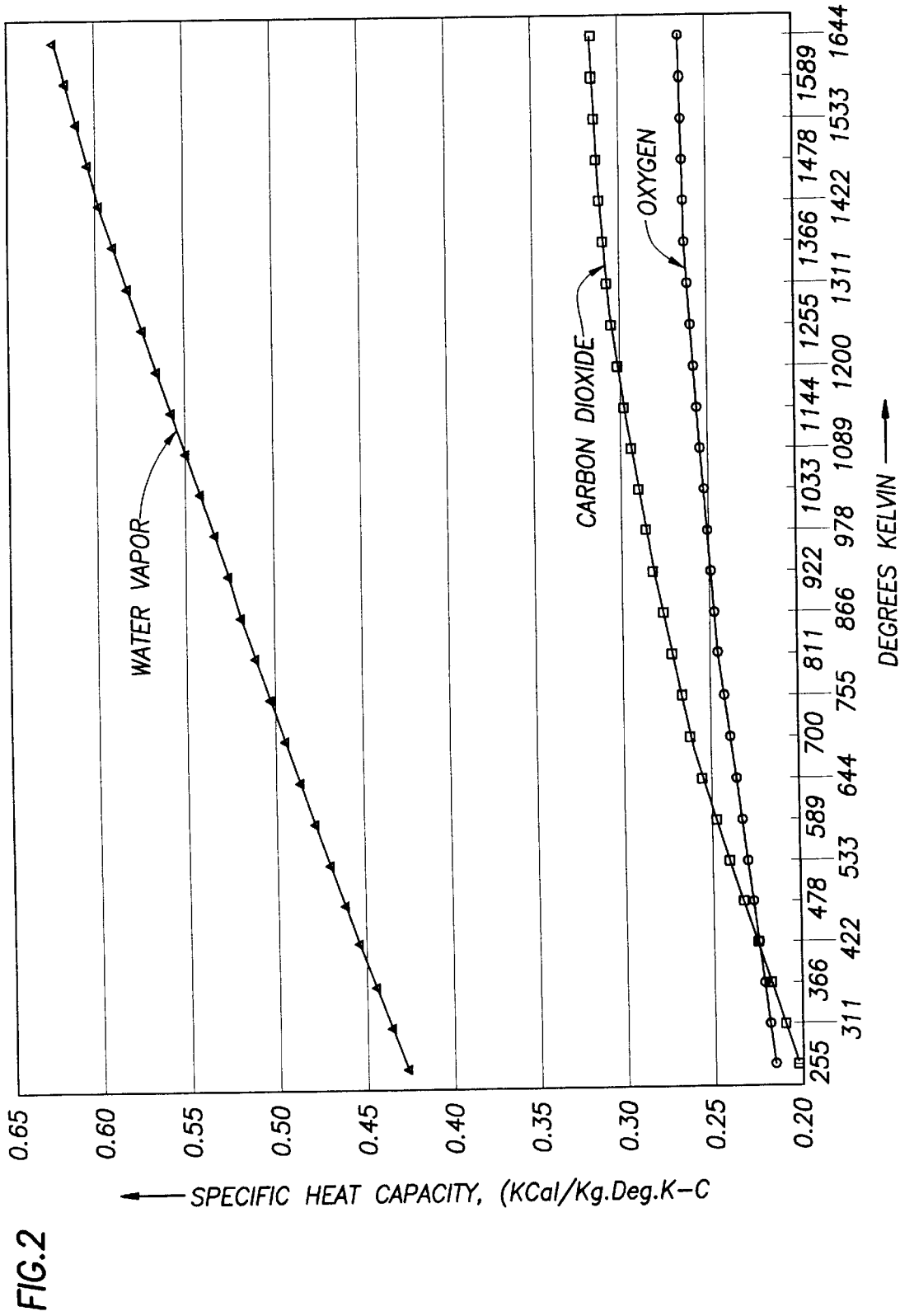
FIG. 2 is a graphical representation of the effect of temperature on the specific heat capacity of oxygen, carbon dioxide, and water.

FIG. 2 graphically depicts the relationship noted by these calculations.

The specific heat capacity of a mixture of gases can be approximated by scaling each individual gas constituent specific heat capacity to that constituent's mass percentage of the mixture and summing the values derived. A mixture composed of 52.88462% carbon dioxide, 43.26923% water vapor and 3.84615% oxygen will then have a resultant specific heat capacity as follows:

$$C_{P(MIXTURE)} = 0.5288462 C_{P(CO2)} + 0.4326923 C_{P(H2O)} + 0.0384615 c_{P(O2)}$$

These are the proportions calculated for the combustion gas produced from the complete combustion of methane with pure oxygen with a 5% surplus of oxygen being supplied. Knowing the amount of thermal energy released from the combustion reaction as sensible heat and the ambient temperature at which the combustion gas constituents entered the process one can calculate both the specific heat capacity of the resulting gas mixture and the theoretical maximum combustion gas temperature. Considering that both the resulting gas temperature and the specific heat capacity of the gas mixture are interdependent variables, a re-iterative process may be applied to calculate these parameters.

To avoid the high combustion gas temperatures noted by Wagner while allowing the combustion process of the present invention to be used in a practical manner with standard combustion chamber construction and standard energy recovery boiler equipment combinations of combustion gas recirculation and water injection are utilized. Calculations have been carried out to determine the appropriate quantities of combustion gas recirculation and water injection required to achieve 2,500 degrees Fahrenheit in the combustion chamber of the present invention. The data charts and plots which follow detail the calculation results.

Table One below details the data derived from the calculations utilized to produce FIG. 3.

TABLE ONE

Relative Mass Flows For Methane-Oxygen Combustion
Water Injection & Recirculation To Maintain 2500 Deg. F.

|  | Extra $H_2O$ Injection | Recirc. Mass | Total Mass |
|---|---|---|---|
| Case One | 6.426 | 0 | 11.626 |
| Case Two | 0 | 15.75 | 20.95 |
| Case Three | 1 | 12.492 | 18.692 |
| Case Four | 2 | 9.75 | 16.96 |
| Case Five | 3 | 7.32 | 15.52 |
| Case Six | 4 | 5.06 | 14.26 |
| Case Seven | 5 | 2.92 | 13.12 |
| Case Eight | 6 | 0.86 | 12.06 |

Note from the calculations and plotted data derived therefrom that control can be exercised over the quantity of combustion gas generated per unit of fuel mass combusted while maintaining a moderate combustion gas temperature. Utilizing a combination of water injection and recirculation of cooled combustion gas the total mass flow of combustion gas out of the combustion chambers can vary from 20.95 to 11.626 mass units per mass unit of methane fuel combusted with 1.05 times stoichiometric oxygen while maintaining 2,500 degrees Fahrenheit combustion gas temperature. These calculations assume a 10% loss of thermal energy through the combustion chamber walls. The lowest combustion gas mass flow is achieved with zero combustion gas recirculation and water injection alone utilized to moderate combustion gas temperature. The latent heat of vaporization of water is utilized to advantage in this case as a means of minimizing mass flow per unit of fuel mass being combusted. Under circumstances where this type of operation is favored the present invention can be so operated. Otherwise some combination of water injection and cooled combustion gas recirculation will normally be utilized as the means to control combustion gas temperature in the combustion chambers.

As shown in FIG. 4, the highest level of carbon dioxide in the combustion gas occurs with zero water injection and recirculation of combustion gas alone being utilized to moderate combustion gas temperature. In this case the level of carbon dioxide will reach 52.88% of the total combustion gas production rate. The lowest level of carbon dioxide in the combustion gas occurs with zero recirculation and water injection alone moderating the combustion gas temperature. In this case the level of carbon dioxide will drop to 23.65% of the combustion gas mass out of the combustion chamber.

Energy absorbed as latent heat of vaporization into water is not recovered in the energy boiler of the present invention. This is a disadvantage of water injection to moderate combustion gas temperature. An advantage of water injection in addition to the reduced combustion gas volume is the fact that a portion of the water can readily be condensed by cooling the combustion gases with a groundwater indirect heat exchanger prior to the inlet of the of the carbon dioxide recovery system. By condensing a portion of the water vapor carried as a constituent of the combustion gas the gas volume is reduced and a cleansing effect is achieved for the combustion gas. As water droplets form during condensation, particulate matter and acidic constituents that might be carried in the gas due to less than ideal fuel composition are efficiently removed from the gas with the condensate. With a higher percentage of water and increased condensation, higher efficiency gas cleaning is achieved. When utilizing fuels that contain acid producing constituents and constituents that result in particulate matter formation water, injection enhances the combustion gas cleansing process between the energy recovery boiler and carbon dioxide recovery system of the present invention and is included in the preferred embodiment for that reason. Additionally, the present invention includes a provision for an optional electron beam oxidation reactor to enhance the overall combustion efficiency of the process. Water molecules produce OH radials and atomic oxygen when bombarded by accelerated electrons. These highly reactive molecules act as scavengers for dilute concentrations of residual and reformed organic compounds in the post combustion chamber combustion gas stream. Included in the organic compounds that might be present in the post combustion chamber combustion gas stream are dioxins and furans. Destroying these compounds to avoid contamination of the process effluents from the present invention is a high priority consideration.

Figure 5A:
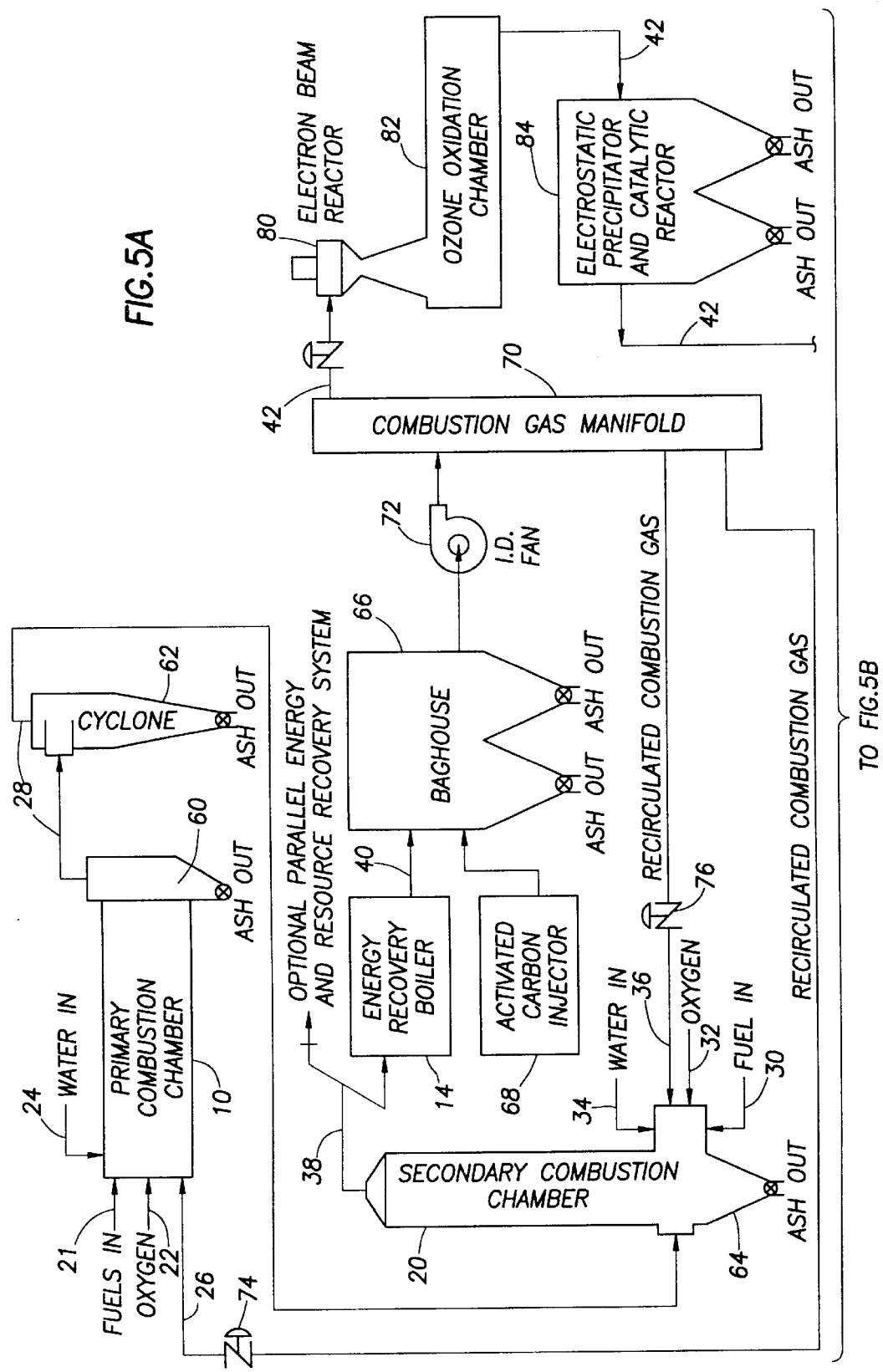
FIGS. 5A and 5B depict a process flow diagram of a preferred embodiment of the present invention.
Figure 5B:
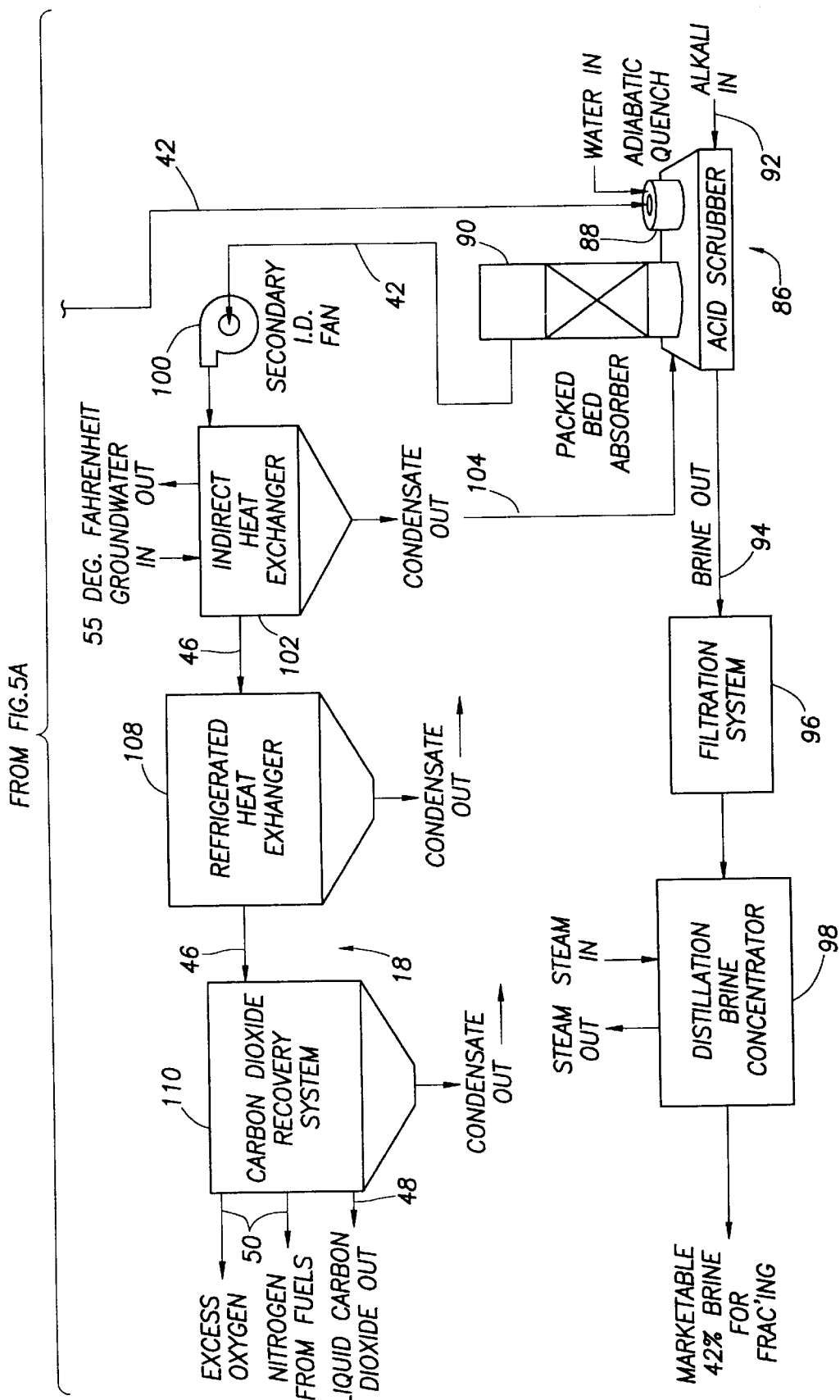

As shown in FIGS. 5A and 5B, the process of the present invention begins by introducing a fuel stream 21, oxygen stream 22, and a water stream 24 into primary combustion chamber 10 wherein the hydrocarbons from the fuel are combusted to produce the combustion product of carbon dioxide, water, and other combustion gases. Primary combustion chamber 10 has an ash separation section 60 for removing a portion of solid components including ash that result from the combustion process. Combustion product 28 is then introduced into a separation cyclone 62 to remove additional ash and solids. Separation cyclone 62 is of a variety commonly known to those skilled in the art of combustion process. Having had the ash removed, combustion product stream 28 is then introduced into secondary combustion chamber 20.

Preferably, secondary combustion chamber 20 is a vertical combustion chamber such as is known by those of ordinary skill in the art. Hydrocarbons from combustion product stream 28 are reacted with an additional fuel stream 30, a second substantially pure oxygen stream 32, and a second water stream 34 in secondary combustion chamber 20. Fuel streams 21 and 30 can be a variety of fuels, including methane and other hydrocarbon-containing compounds. Solids, ash and other particulate matter are removed from a bottom cone section 64 of secondary combustion chamber 20. Reaction product stream 38 exits from the top of secondary combustion chamber 20. Secondary combustion chamber 20 is included in the process of the present invention to produce high combustion efficiency.

An important feature of the process of the present invention is the ability to recover the energy, in the form of heat, from reaction product stream 38. Preferably, an energy recovery boiler 14 is used to recover the heat energy from reaction product stream 38. As those skilled in the art would recognize, energy recovery boiler 14 is used to generate steam by transferring the heat energy from reaction product 38 to a water stream. A portion of stream 38 can be used in parallel with energy recovery boiler 14 to heat other process streams through cross exchanges of energy. Alternatively, other forms of heat exchangers can be used to recover the heat energy from reaction product stream 38 in place of energy recover boiler 14. Removal of the heat energy from stream 38 in recovery boiler 14 results in a cooler stream temperature. Preferably, stream 38 is cooled to about 450 degrees Fahrenheit.

Cooled reaction product stream 40 is then introduced into a bag house 66 for removal of particulate matter from cooled reaction product stream 40. Bag house 66 is of a design commonly known and used by those skilled in the art. Preferably, an activated carbon injector 68 can be utilized along with bag house 66 to assist in removal of particulate matter.

Upon exiting bag house 66, cooled reaction product stream 40 is introduced into combustion gas manifold 70. Fan 72 can be used to increase the pressure of cooled reaction product stream 40 prior to introduction into gas manifold 70.

In gas manifold 70, cooled reaction product stream 40 is split into three streams. First stream 26 is recirculated to primary combustion chamber 10 to increase combustion efficiency. The amount of recirculating combustion gas introduced into primary combustion chamber 10 can be controlled by control valve 74 or other means of regulating stream volume. A second portion of gas is removed from combustion gas manifold 70 and recirculated as gas stream 36 into secondary combustion chamber 20. The volume of gas flow from stream 36 is controlled by a control valve 76 or other means of regulating flow. Recirculation of gas stream 36 is introduced to secondary combustion chamber 20 to increase the efficiency of secondary combustion chamber 20.

The remaining portion of reaction product stream 40 exits combustion gas manifold 70 as stream 42. Stream 42 is essentially the product stream from the combustion portion of the process of the present invention. Stream 42 comprises carbon dioxide, water, along with various other impurities and unreacted components from the combustion process. Stream 42 is introduced into electron beam reactor 80 to break down residual dilute organic compounds contained within stream 42 and to impart an electrical charge on any residual particulate matter in stream 42. Electron beam reactor 80 is of a variety commonly known and available to those skilled in the art. Stream 42 exits electron beam reactor 80 directly into ozone oxidation chamber 82 where additional components are oxidized and aid removal of them from the gas stream.

Next, stream 42 is introduced into an electrostatic precipitator and catalytic reactor 84. In precipitator 84, additional particulate matter is removed from stream 42 including the particulate matter electrically charged by electron beam reactor 80.

Stream 42 is next introduced into acid scrubber system 86 to remove any remaining acidic constituents in the gas stream. Acid scrubber system 86 comprises an adiabatic quench 88 and pack bed absorber 90. Acid scrubber system 86 is of a design commonly known to those skilled in the art of purifying gas streams. An alkaline stream 92 is contacted through countercurrent flow to pack bed absorber 90 to react away acidic components found in stream 42. Optionally, acid scrubber system 86 may consist of a series of pack bed absorbers 90 to increase contact efficiency. The brine stream 94, which results from a contact of the alkaline stream 92 with the acid gas components, can then be filtered in filtration system 96. Stream 94 is then concentrated in distillation brine concentrator 98 to produce, for example, a marketable 42% brine stream for use in downhole hydrocarbon production, particularly fracturing operations.

Upon exiting acid scrubber system 86, stream 42 is increased in pressure by fan 100 and introduced into indirect heat exchanger 102. Indirect heat exchanger 102 is of a variety commonly known to those skilled in the art of heat transfer. Preferably, ground water at approximately 55° F. is used to condense the water vapor from stream 42. The condensation of water vapor also removes most of any remaining forms of contamination in the gas stream. Additionally, a condensate stream 104 comprising the water and any residual contaminants is returned to acid scrubber system 86 where it is combined with the brine.

Carbon dioxide stream 46 is then introduced into recovery system 18. Initially, stream 46 is introduced to a refrigeration heat exchanger 108. Stream 46 then enters carbon dioxide recovery system 110 where liquid carbon dioxide is separated from any excess oxygen or nitrogen remaining in stream 46. Carbon dioxide recovery system 110 is of a design commonly known to those of ordinary skill in the art. As can be seen, liquid carbon dioxide stream 48 can then be marketed as a product to those needing carbon dioxide streams.

Finally, gas discharge stream 50 comprising excess oxygen and any nitrogen originally introduced through fuel streams 20 and 30 can be discharged to the atmosphere. When operated under conditions such as described herein, gas discharge stream 50 is eliminated or substantially reduced in comparison to prior art combustion processes.

Figure 6B:
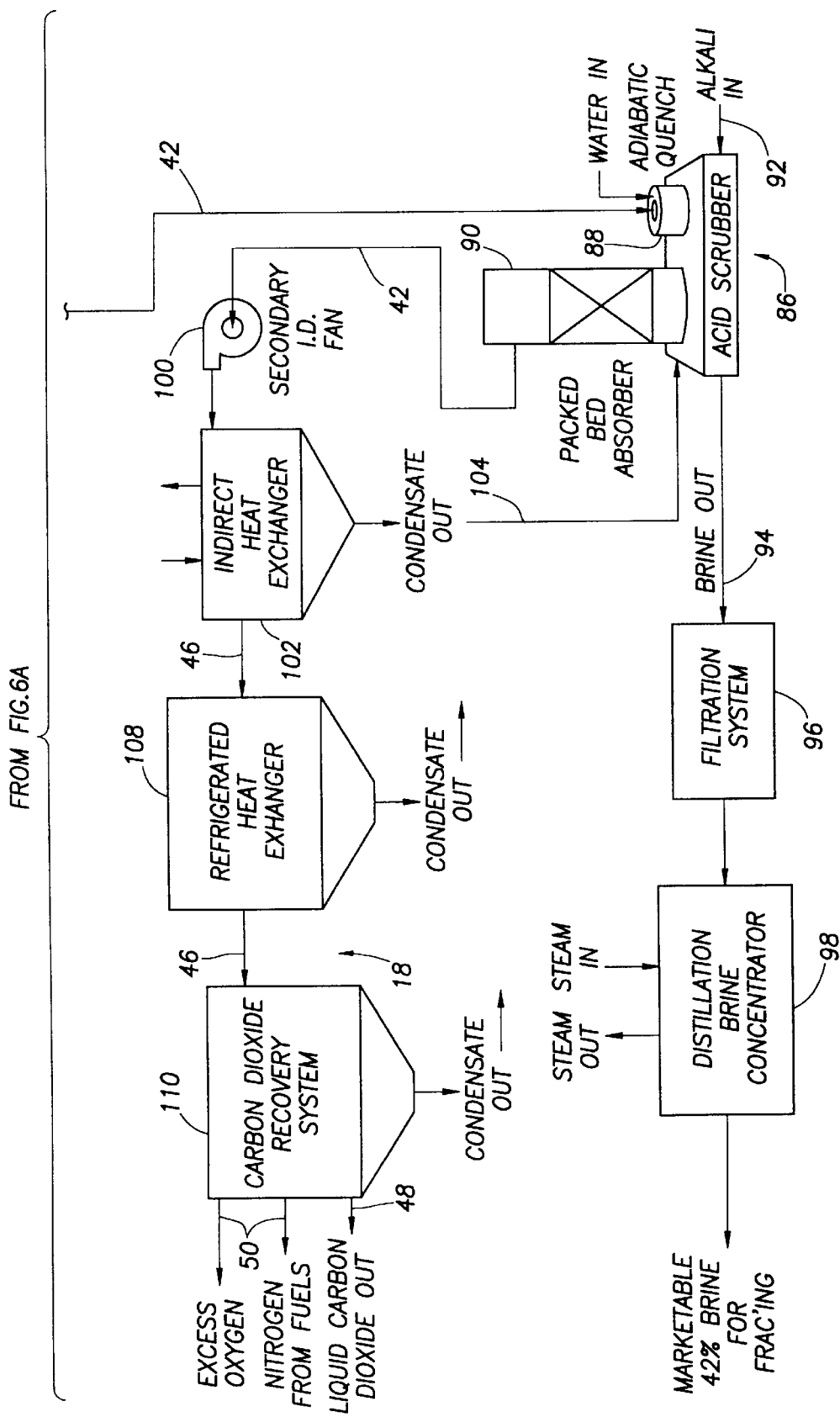

FIGS. 6A and 6B disclose an adaptation of the embodiment of the present invention disclosed in FIGS. 5A and 5B. Particularly, the process of FIGS. 6A and 6B have been adapted to include plasma torches 120 and 122 and emergency evacuation chamber 124. Plasma torches 120 and 122 are of a variety commonly known to those skilled in the art. Emergency evacuation chamber 124 is an additional safety feature to enhance the safety associated with the process of the present invention.

By utilizing pure oxygen for combustion and employing water injection and recirculated combustion gas to moderate combustion gas temperature in the combustion chambers the present invention allows all products of combustion to be captured before emission into the environment. The captured products of combustion include carbon dioxide, water, and excess oxygen. When nitrogen is present in the fuels being combusted a mix of oxygen with a fractional trace of nitrogen will be removed together. Provision is made in the present invention to maintain the highest possible combustion efficiency to reduce the level of trace organic compounds in the combustion gas. Provision is also made to remove with the highest efficiency possible any acidic and particulate constituents produced by the combustion of less than ideal fuels in the combustion chambers of the present invention allowing the recovery carbon dioxide and residual oxygen.

The foregoing disclosure and description of the invention are illustrative and explanatory thereof, and various changes in the details of the illustrated apparatus and construction and method of operation may be made without departing from the spirit of the invention.

I claim:

1. A system for combusting hydrocarbon streams and recovering the carbon dioxide produced during combustion, comprising:
   a combustion chamber for reacting hydrocarbons and a substantially pure oxygen stream;
   a heat exchanger in fluid communication with said combustion chamber for recovering heat from reaction products of said combustion chamber;
   a bag house, downstream of said heat exchanger, for removing particulate from the reaction products;
   a reaction product manifold, in fluid communication with said bag house. said manifold comprising a first recirculation line for recycling reaction products to said combustion chamber, and a second product line;
   a scrubbing column in fluid communication with said second product line; and
   a condenser, downstream of said scrubbing column, for condensing water from the reaction product stream.

2. The system of claim 1, further comprising:
   an electronic beam reactor in fluid communication with said second product line, downstream of said manifold, for breaking down residual organic compounds and to electrostatically charge residual particulate matter in the reaction products; and
   an electrostatic precipitator, downstream of said beam reactor, for removing residual particulate matter electrostatically charged in said electronic beam reactor.

3. The system of claim 1, further comprising a purification unit, downstream of said condenser, for purifying carbon dioxide from the reaction products.

4. The system of claim 1, further comprising:
   a filtration unit for filtering brine solution exiting said scrubbing column; and
   a distillation unit for concentrating the brine solution after filtration.

5. A system for combusting hydrocarbon streams and recovering the carbon dioxide produced during combustion, comprising:
   a primary combustion chamber for reacting hydrocarbons and substantially pure oxygen stream;
   a secondary combustion chamber, downstream of said primary combustion chamber, for further combusting unreacted components from said primary combustion chamber;
   a heat exchanger in fluid communication with said secondary combustion chamber for recovering heat from reaction products of said secondary combustion chamber;
   a bag house, downstream of said heat exchanger, for removing particulate from the reaction products;
   a reaction product manifold in fluid communication with said bag house, said manifold comprising a first recirculation line for recycling reaction products to said primary combustion chamber, a second recirculation line for recycling reaction products to said secondary combustion chamber, and a third product line;
   a scrubbing column in fluid communication with said third product line; and
   a condenser, downstream of said scrubbing column, for condensing water from the reaction product stream.

6. The system of claim 5, further comprising:
   an electronic beam reactor in fluid communication with said third product line, downstream of said manifold, for breaking down residual organic compounds and to electrostatically charge residual particulate matter in the reaction products; and
   an electrostatic precipitator, downstream of said beam reactors, for removing residual particulate matter electrostatically charged in said electronic beam reactor.

7. The system of claim 5, further comprising a purification unit, downstream of said condenser, for purifying carbon dioxide from the reaction products.

8. The system of claim 5, further comprising:
   a filtration unit for filtering brine solution exiting said scrubbing column; and
   a distillation unit for concentrating the brine solution after filtration.

9. A system for combusting hydrocarbon streams and recovering the carbon dioxide produced during combustion, comprising:
   a primary combustion chamber for reacting hydrocarbons and oxygen;
   a secondary combustion chamber, downstream of said primary combustion chamber, for further combusting unreacted components from said primary combustion chamber;

a heat exchanger in fluid communication with said secondary combustion chamber for recovering heat from reaction products of said secondary combustion chamber;

a bag house, downstream of said heat exchanger, for removing particulate from the reaction products;

a reaction product manifold in fluid communication with said bag house, said manifold comprising a first recirculation line for recycling reaction products to said primary combustion chamber, a second recirculation line for recycling reaction products to said secondary combustion chamber, and a third product line;

a scrubbing column in fluid communication with said third product line; a condenser, downstream of said scrubbing column, for condensing water from the reaction product stream;

an electronic beam reactor in fluid communication with said third product line, downstream of said manifold, for breaking down residual organic compounds and to electrostatically charge residual particulate matter in the reaction products; and an electrostatic precipitator, downstream of said electronic beam reactor, for removing residual particulate matter electrostatically charged in said electronic beam reactor.

10. The system of claim 9, further comprising a purification unit, downstream of said condenser, for purifying carbon dioxide from the reaction products.

11. The system of claim 9, further comprising:

a filtration unit, downstream of said scrubbing column, for filtering brine solution exiting said scrubbing column; and a distillation unit in fluid communication with said filtration unit for concentrating the brine solution after filtration.

12. A system for combusting hydrocarbon streams and recovering the carbon dioxide produced during combustion, comprising:

a combustion chamber for reacting hydrocarbons and oxygen;

a heat exchanger in fluid communication with said combustion chamber for recovering heat from reaction products of said combustion chamber;

a bag house, downstream of said heat exchanger, for removing particulate from the reaction products;

a reaction product manifold, in fluid communication with said manifold, comprising a first recirculation line for recycling reaction products to said combustion chamber, and a second product line;

an electronic beam reactor in fluid communication with said second product line, downstream of said manifold, for breaking down residual organic compounds and to electrostatically charge residual particulate matter in the reaction products;

an electrostatic precipitator, downstream of said beam reactor, for removing residual particulate matter electrostatically charged in said electronic beam reactor;

a scrubbing column in fluid communication with said precipitator; and a condenser, downstream of said scrubbing column, for condensing water from the reaction product stream.

13. A system for combusting hydrocarbon streams and recovering the carbon dioxide produced during combustion, comprising:

a combustion chamber for reacting hydrocarbons and oxygen;

a heat exchanger in fluid communication with said combustion chamber for recovering heat from reaction products of said combustion chamber;

a bag house, downstream of said heat exchanger, for removing particulate from the reaction products;

a reaction product manifold, in fluid communication with said bag house, said manifold comprising a first recirculation line for recycling reaction products to said combustion chamber, and a second product line;

a scrubbing column in fluid communication with said second product line;

a condenser, downstream of said scrubbing column, for condensing water from the reaction product stream; and a purification unit, downstream of said condenser, for purifying carbon dioxide from the reaction products.

14. A system for combusting hydrocarbon streams and recovering the carbon dioxide produced during combustion, comprising:

a combustion chamber for reacting hydrocarbons and oxygen;

a heat exchanger in fluid communication with said combustion chamber for recovering heat from reaction products of said combustion chamber;

a bag house, downstream of said heat exchanger, for removing particulate from the reaction products;

a reaction product manifold, in fluid communication with said bag house, said manifold comprising a first recirculation line for recycling reaction products to said combustion chamber, and a second product line;

a scrubbing column in fluid communication with said second product line;

a condenser, downstream of said scrubbing column, for condensing water from the reaction product stream;

a filtration unit in fluid communication with said scrubbing column for filtering brine solution exiting said scrubbing column; and a distillation unit in fluid communication with said filtration unit for concentrating the brine solution after filtration.

15. A system for combusting hydrocarbon streams and recovering the carbon dioxide produced during combustion, comprising:

a primary combustion chamber for reacting hydrocarbons and an oxygen stream;

a secondary combustion chamber, downstream of said primary combustion chamber, for further combusting unreacted components from said primary combustion chamber;

a heat exchanger in fluid communication with said secondary combustion chamber for recovering heat from reaction products of said secondary combustion chamber;

a bag house, downstream of said heat exchanger, for removing particulate from the reaction products;

a reaction product manifold in fluid communication with said bag house, said manifold comprising a first recirculation line for recycling reaction products to said primary combustion chamber, a second recirculation line for recycling reaction products to said secondary combustion chamber, and a third product line;

an electronic beam reactor in fluid communication with said third product line, downstream of said manifold, for breaking down residual organic compounds and to electrostatically charge residual particulate matter in the reaction products; and an electrostatic precipitator for removing residual particulate matter electrostatically charged in said electronic beam reactor;

a scrubbing column in fluid communication with said precipitator; and a condenser, downstream of said scrubbing column, for condensing water from the reaction products.

* * * * *